United States Patent [19]

Boylan

[11] 4,340,500

[45] * Jul. 20, 1982

[54] LIQUID DEFOAMER AND PROCESS OF USE THEREOF

[75] Inventor: Francis J. Boylan, Newton, N.J.

[73] Assignee: Drew Chemical Corporation, Boonton, N.J.

[*] Notice: The portion of the term of this patent subsequent to Dec. 1, 1998, has been disclaimed.

[21] Appl. No.: 239,430

[22] Filed: Mar. 2, 1981

Related U.S. Application Data

[63] Continuation-in-part of Ser. No. 135,478, Mar. 31, 1980, Pat. No. 4,303,549, and Ser. No. 85,781, Oct. 18, 1979, abandoned.

[51] Int. Cl.$^3$ ............................................. B01D 19/04
[52] U.S. Cl. .................................... 252/321; 162/179; 252/314; 252/358
[58] Field of Search ................................ 252/321, 358

[56] References Cited

U.S. PATENT DOCUMENTS 2,797,198   6/1957   Chappell, Jr. ...................... 252/358
4,024,072   5/1977   Shane et al. ......................... 252/358

FOREIGN PATENT DOCUMENTS 534604   12/1956   Canada ............................... 252/358
1402597  11/1972   United Kingdom .
2038793  11/1979   United Kingdom .

*Primary Examiner*—Richard D. Lovering
*Attorney, Agent, or Firm*—Elliot M. Olstein; Louis E. Marn

[57] ABSTRACT

A free flowing aqueous defoamer comprised of alcohol, a fatty acid, a soap of a fatty acid and an anionic and/or non-ionic surfactant which prevents formation of a gelled mass of the solids and provides a free flowing dispersion of the solids in the water, with the solids contents being at least 5%, preferably at least 20%, all by weight. In a preferred embodiment, the composition includes a water soluble metal salt to render the surfaces of the solids hydrophobic. The defoamer has particular applicability for defoaming paper machine stock.

30 Claims, No Drawings

LIQUID DEFOAMER AND PROCESS OF USE THEREOF

This application is a continuation-in-part of U.S. application ser. No. 85,781, filed on Oct. 18, 1979 and now abandoned, and U.S. Application Ser. No. 135,478, filed on Mar. 31, 1980 and now U.S. Pat. No. 4,303,549.

This invention relates to a defoamer, and more particularly to a defoamer which has particular effectiveness in the paper making industry.

Canadian Pat. No. 534,604 discloses a solid foam combating composition which is particularly useful in the paper making industry. Such defoaming composition is comprised of a solid alcohol, a solid fatty acid and a solid fatty acid soap, and in order to use such defoamer, the solid has to be dispersed in hot, softened water at the site of application.

In many cases, it would be preferable to have a defoamer which is in free flowing liquid form in order to permit pumping of the defoamer directly from storage to the place of application. In attempting to disperse the prior art defoamer in water at a solids content which is economical for preparation and shipping, it was found that a thick gel or paste was formed which would prevent pumping of the defoamer from a storage tank to the place of desired application. For example, when the solids content exceeds about 3% to 4% a gel mass is formed which prevents pumping of the defoamer.

In accordance with one aspect of the present invention, there is provided a free flowing aqueous defoaming composition which is comprised of (a) water; (b) at least one alcohol; (c) at least one fatty acid; (d) a soap of at least one fatty acid, with components (b), (c) and (d) being present in the water in an effective defoaming amount and to provide a dispersed solids content in the water of at least 5%; and (e) a surfactant which is comprised of at least one of non-ionic surfactants and anionic surfactants which prevents formation of a gelled mass of the solids and provides a free flowing dispersion of the solids in the water. Thus, in accordance with the present invention, there is provided an effective liquid defoamer, having particular applicability to the paper making industry, which can be prepared in liquid form with a suitable solids content, and which is free flowing whereby the defoaming composition can be easily stored and pumped as required for defoaming in an aqueous system.

In accordance with a preferred embodiment, the composition has been treated to provide the dispersed solids with hydrophobic surfaces.

In accordance with the preferred embodiment, the composition is treated to provide the dispersed solids (which are gel-like particles dispersed in the water) with hydrophobic surfaces to thereby maintain the effectiveness of the defoaming composition over a wide pH range; in particular, defoaming efficiency is maintained in systems operated at higher pH values. In accordance with a particularly preferred embodiment, the composition is treated with at least one water soluble salt of a metal, which has a valence greater than one to provide the solids with hydrophobic surfaces. The water soluble salt may be a salt of iron (ferrous and/or ferric), calcium, magnesium, barium or aluminum, or mixtures thereof, preferably an aluminum salt, and as representative examples of such salts there may be mentioned: alum ($Al_2(SO_4)_3 \cdot 18H_2O$), calcium chloride, ferric chloride, barium chloride, magnesium chloride, etc. The treatment may be conveniently accomplished by formulating the composition, and subsequently adding the metal salt with the presence of such metal salt in the composition providing the dispersed solids with hydrophobic surfaces. Although applicant does not intend to limit the invention by any theoretical reasoning, it is believed that the added metal salt interacts at the particle surface, with the fatty acid and/or fatty acid soap to form on the surface the corresponding metal salt of the fatty acid to thereby provide hydrophobic particle surfaces.

It is to be understood that the defoamer may be formulated without treatment to provide hydrophobic surfaces, although such a treatment is preferred.

The alcohol component of the defoamer is a higher aliphatic alcohol, which generally has from 10 to 28 carbon atoms, (most generally 14 to 28 carbon atoms), and preferably from 16 to 18 carbon atoms. The alcohol component may be comprised of one or more of such alcohols. The alcohol component may contain one or more hydroxyl groups, and may contain groups in addition to such hydroxyl groups. Thus, for example, the alcohol component may be a partial ester of glycerin; e.g., glycerin monostearate or; for example, a partial ester of a glycol. The preferred compounds are hydrocarbon alcohols, and as hereinabove indicated, preferably those having from 16 to 18 carbon atoms. In most cases, the preferred alcohol is a solid (at room temperature); however, it is also possible for the alcohol to be in liquid form, particularly the higher branched alcohols.

The fatty acid component of the defoamer is a higher aliphatic acid which is a solid at room temperature and which generally has from 14 to 28 carbon atoms, with fatty acids having from 16 to 18 carbon atoms being preferred. The fatty acid may contain other functional groups; however, hydrocarbon fatty acids are preferred, particularly those having from 16 to 18 carbon atoms.

The fatty acid soap component of the defoamer is a soap of a fatty acid of the type hereinabove described. The soap may be formed from a fatty acid identical to the fatty acid employed as the fatty acid component of the defoamer. Such soaps are generally formed as an alkali metal or amine soap of the fatty acid, preferably an amine soap. A preferred amine is triethanolamine. The soap is preferably formed, in situ, by adding a soap forming component, such as an amine, to the mixture of alcohol and fatty acid. The formation of a fatty acid soap is well known in the art, and no further details in this respect are needed for a complete understanding of the invention.

As hereinabove indicated, the three components of the defoaming composition are dispersed in water in an effective defoaming amount, and to provide a solids content dispersed in the water of at least 5%, preferably at least 20%, all by weight. In general, the solids content is no greater than 30%, by weight, with the solids content most generally being in the order of from 20% to 25%, all by weight.

In the composition, the weight ratio of fatty acid component to alcohol component does not exceed 0.5:1, with the fatty acid generally being present in an amount of at least 0.2:1 of the solid alcohol, all by weight. In most cases, the weight ratio of solid fatty acid to solid alcohol is in the order of from 0.2:1 to 0.4:1.

The fatty acid soap is present in the composition in an amount which provides a fatty acid soap to solid alcohol ratio of no greater than 0.5:1, with the soap generally being present in an amount to provide a fatty acid soap to alcohol ratio of at least 0.1:1, all by weight. In most cases, the ratio of fatty acid soap to alcohol is in the order of from 0.1:1 to 0.3:1, all by weight.

The selection of suitable amounts of the three components of the defoaming composition to provide effective defoaming amounts thereof for a particular purpose is deemed to be well within the scope of those skilled in the art from the teachings herein, and as a result, those skilled in the art can readily select optimum proportions from the present teachings.

The defoamer composition of the present invention further includes a surfactant comprised of at least one of a non-ionic surfactant or an anionic surfactant which prevents formation of a gelled mass of the solids to provide a free flowing dispersion of the solids in the water. Thus, in accordance with the present invention, by employing such a surfactant, it is possible to disperse the three components in the water in usable concentrations (at least 5%, preferably at least 20%, by weight), without formation of a gelled mass of the solids to thereby provide a free flowing aqueous defoaming composition which is capable of being pumped from storage.

The surfactant employed in the present invention, as hereinabove described, is a non-ionic and/or anionic surfactant (other than a soap) which prevents formation of a gelled mass of the solids. Applicant has tested several cationic surfactants, and has found that such cationic surfactants are generally not suitable for the purposes of the present invention; i.e., such cationic surfactants do not prevent formation of a gelled mass of solids.

The non-ionic surfactants which have been found to be particularly suitable for the purposes of the present invention are ethylene oxide condensation products (polyoxyethylene) containing more than two, and preferably at least five ethylene oxide groups, with at least one end group thereof being terminated by condensation with either an alcohol; alkyl phenol, preferably nonyl phenol; or a long chain fatty acid; for example, mono oleate terminated ethylene oxide condensation product.

The anionic surfactants which have been found to be particularly suitable for the purposes of the present invention are alcohol sulfates, alkaryl sulfonates, ethoxylated alcohol sulfates, sulfates and sulfonates of ethoxylated alkyl phenols, sulfates of fatty esters, sulfates and sulfonates or alkyl phenols, sulfonates of condensed naphthalenes, sulfonates of naphthalene, sodium derivatives of sulfo-succinates, such as the disodium ethoxylated nonyl phenol half ester of sulfosuccinic acid, the disodium ethoxylated alcohol ($C_{10}$–$C_{11}$), half-ester of sulfosuccinic acids; etc. alkali salts of petroleum sulfonates such as sodium petroleum sulfonate (Acto 632); alkali phosphate esters, such as a potassium salt of phosphate ester (Triton H66); sulfonated alkyl esters for example (Triton GR 7); sodium polymeric carboxylic acid (Tamol 731) and the like.

The preferred surfactant for the purposes of the present invention is one or more of the oxyethylene polymers containing more than two, and preferably at least five ethylene oxide groups, which have one end terminated by condensation with a compound, as hereinabove described, with particularly good results being obtained with nonyl phenol terminated polyoxyethylene products.

The anionic and/or non-ionic surfactant is employed in the composition as hereinabove described in an amount effective to prevent formation of a gelled mass of the solids and to provide a free flowing aqueous defoamer. In general, the surfactant is employed in an amount to provide at least 0.1 parts of surfactant per one part of the total of alcohol, fatty acid and soap, by weight. In general, the surfactant is not employed in an amount greater than 0.4 part per 1 part of the total of the alcohol, fatty acid and soap component in that no added beneficial effect is obtained by the use of greater amounts. If a metal salt is employed to provide hydrophobic particle surfaces, such metal salt is added in an amount which is effective to provide such hydrophobic particle surfaces. In general, the salt is added in an amount sufficient to react with from 15% to 25% of the total fatty acid present in the composition, with such amounts providing hydrophobic surfaces while retaining defoaming efficiency.

The defoamer of the present invention may be conveniently formulated by emulsifying the fatty acid and alcohol with the surfactant at a temperature above the melting point of the solids, followed by cooling to room temperature. The mixture is then highly agitated and a soap forming component, such as triethanolamine is added. High agitation at a temperature above the melting point of the solids should be avoided, after soap formation, in that such high agitation may adversely affect defoaming efficiency.

As an alternative method for producing the defoamer of the present invention, soap may be formed above the melting point of the solids by the use of very low agitation, such as that produced by a dough blender.

The defoamer of the present invention is suitable for providing defoaming in a wide variety of aqueous system; however, it has been found that such a defoamer has particular applicability to the paper industry, and is used particularly for defoaming in a paper machine stock. The defoaming composition of the present invention is added to the aqueous system in an effective defoaming amount, with such defoamer generally being added in an amount to provide at least 1 ppm of the total composition in the aqueous system. In general, no added beneficial affect is obtained by the use of amounts greater than 50 ppm. of the total composition (water, alcohol, acid, soap and surfactant). It is to be understood that the specific amount to be employed will vary with each system, and the selection of an optimum amount is deemed to be within the scope of those skilled in the art from the present teachings.

The invention will be further described with respect to the following examples, however, the scope of the invention is not to be limited thereby:

EXAMPLE I

The defoamer compositions were prepared as in Table I:

TABLE I

|     | Component | Amount gms. |
| --- | --- | --- |
| (a) | Solid alcohol $C_{18}$ to $C_{28}$ linear alcohols (ALFOL 20+) | 34.95 |
| (b) | Solid Acid $C_{14}$ to $C_{22}$ saturated fatty acids (Industrene 3022) | 12.72 |
| (c) | Surfactant | 7.83 |
| (d) | Deionized water | 240.0 |
| (e) | Triethanolamine | 4.50 |

The composition was prepared by emulsifying the solid alcohol, solid acid and surfactant in water, with agitation at 65° C., following by cooling to 30° C. with high agitation and addition of the triethanolamine with high agitation, until homogeneous, at 30° C.

The composition was formulated with various surfactants, and the viscosity measured in a Brookfield Viscometer at 25° C., at the time of preparation, and then after standing for 24 hours.

The defoaming ability was measured in a mixer, using a liter of solution containing 0.4% fortified rosin size and 0.015% $Al_2(SO_4)_3 \cdot 18H_2O$. The mixer was run on low speed for 20 seconds. Then 10 ppm defoamer (total composition) was added, and the mixer run for an additional 40 seconds. Upon stopping the mixer, the amount and stability of any foam remaining was observed.

The results with the various surfactants are tabulated in Table II:

TABLE II

|  | VISCOSITY | EFFICIENCY |
|---|---|---|
| ANIONICS | | |
| Sulfonated alkyl ester (Triton GR7) 24 hours | 410–410<br>1266–672 | Good |
| Sodium Polymeric carboxylic acid (Tamol 731) | 244–110 | Good |
| Disodium ethoxylated nonyl phenol half ester of sulfosuccinic acid (Aerosol A103) | 176–186<br>1700–550 | Good |
| Disodium ethoxylated alcohol ($C_{10}$–$C_{11}$) half ester of sulfosuccinic acid (Aerosol A102) | 220–170<br>470–290 | fair–good |
| Sodium petroleum sulfonate (Acto 632) | 1040–704<br>1492–932 | very good |
| Potassium salt of phosphate ester (Triton H66) | 3040–1600<br>3564–2000 | very good |
| NONIONICS | | |
| 2 EO oleyl ether (Brij 92) | gelled | |
| 1½ EO nonyl phenol (Igepal CO 210) | gelled | |
| 5 EO nonyl phenol (Igepal CO 520) | 1630–1210<br>2336–1320 | very good |
| 10–11 EO nonyl phenol (Igepal CO 710) | 360–280<br>900–460 | very good |
| 15 EO nonyl phenol (Igepal CO 730) | 710–534<br>1940–1070 | very good |
| 50 EO nonyl phenol (Igepal CO 970) | 1432–968<br>2512–1570 | very good |
| 20 EO sorbitan monolaurate (Tween 20) | 816–600<br>1450–872 | poor |
| 7 EO monooleate (Lipal 300 W) | 1890–1280<br>2040–1572 | very good |
| Polypropylene oxide-10% (polyethylene oxide (Pluronic) | gelled | |
| Polypropylene glycol 2025 | grainy | |
| Polyethylene glycol (Carbowax 600) | separated while cooling | |
| Sorbitan monooleate | gelled | |
| CATIONICS | | |
| N,N dimethyl cocoamine (Armene DMCD) | gelled | |
| Trimethyl cocoammonium chloride (Arquad C50) | gelled | |
| Trimethyl Tallowammonium chloride (Arquad T50) | gelled | |
| N-tallow, 1,3 diaminopropane acetate (Duomac T) | gelled | |
| EO (15) tallowamine (Ethomeen T/25) | gelled | |

As should be apparent from the above results, the cationics are not suitable for the purposes of the present invention in that such cationic surfactants do not provide a free flowing non-gelling composition.

EXAMPLE 2

The defoamer composition which includes a metal salt to provide hydrophobic surfaces has the following formulation:

| Composition | % |
|---|---|
| Solid $C_{18}$–$C_{28}$ linear fatty alcohol (Alfol 20+) | 11.33 |
| Solid $C_{14}$–$C_{22}$ saturated fatty acid (Industrene 3022) | 4.12 |
| 10–11 Ethylene oxide adduct nonyl phenol (Igepal CO 710) | 2.54 |
| Deionized water | 77.8 |
| Triethanolamine (99%) | 1.46 |
| 22.7% solution of $Al_2(SO_4)_3 \cdot 18H_2O$ | 2.73 |

The composition was prepared by emulsifying the solid alcohol, solid acid and surfactant in water with agitation at 65° C., followed by cooling to 30° C. with high agitation and addition of the triethanolamine with high agitation, until homogeneous, at 30° C. The alum was then added to provide hydrophobic surfaces.

The composition was employed in screen room stock (paper making operation) which was foaming under agitation at a level of 10 ppm. The foam was destroyed.

The present invention is particularly advantageous in that it is possible to provide an effective defoamer formed from a solid alcohol and a solid acid which contains a usable concentration of solids, and which is free flowing. This permits storage of the defoamer in a ready to use form; i.e., there is no necessity to effect dispersion thereof in a hot water solution, whereby the defoamer may be pumped from a suitable storage facility directly to the place of application. Moreover, in accordance with a preferred embodiment by treating the defoamer to provide hydrophobic particle surfaces, defoaming effectiveness is maintained over a wide pH range; e.g., a pH range of from 4–11. In the absence of such treatment, defoaming efficiency is reduced in systems operated at higher pH values.

These and other advantages should be apparent to those skilled in the art from the teachings herein.

I claim:

1. A pumpable free flowing aqueous defoaming composition which can be stored in a ready to use form, comprising:
   (a) water;
   (b) at least one solid alcohol having from 14 to 28 carbon atoms;
   (c) at least one solid fatty acid;
   (d) at least one soap of a solid fatty acid, said components (b), (c) and (d) being present in the water in an effective defoaming amount and to provide a dispersed solids content in the water of at least 5% and no greater than about 30%, by weight; and
   (e) a surfactant comprised of at least one member selected from the group consisting of non-ionic surfactants and anionic surfactants, said anionic surfactant being selected from the group consisting of:
   alcohol sulfates
   alkaryl sulfonates
   ethoxylated alcohol sulfates
   sulfates and sulfonates of ethoxylated alkyl phenols
   sulfates of fatty esters
   sulfates and sulfonates of alkyl phenols
   sulfonates of condensed naphthalenes sulfonates of naphthalene
sodium derivatives of sulfo-succinates
alkali salts of petroleum sulfonates
alkali phosphate esters
sulfonated alkyl esters
sodium polymeric carboxylic acid said surfactant being a surfactant which in combination with components (b), (c) and (d) prevents formation of a gelled mass of the solids at 20%, by weight, dispersed solids in the water to provide a pumpable free flowing dispersion of the solids in the water.

2. The composition of claim 1 wherein the solid alcohol is an aliphatic hydrocarbon alcohol having from 14 to 28 carbon atoms.

3. The composition of claim 2 wherein the solid fatty acid is an aliphatic hydrocarbon fatty acid having from 14 to 28 carbon atoms.

4. The composition of claim 3 wherein the surfactant is at least one non-ionic surfactant.

5. The composition of claim 4 wherein the non-ionic surfactant is a polyoxyethylene having more than two oxyethylene groups having at least one end group terminated by condensation with a member selected from the group consisting of alcohols, alkyl phenols and fatty acids.

6. The composition of claim 5 wherein the non-ionic surfactant contains at least 5 oxyethylene groups.

7. The composition of claim 6 wherein the surfactant is present in an amount to provide at least 0.1 part by weight of surfactant per 1 part by weight of the total of components (b), (c) and (d).

8. The composition of claim 7 wherein the weight ratio of fatty acid to alcohol is at least 0.2:1 and no greater than 0.5:1.

9. The composition of claim 8 wherein the weight ratio of fatty acid soap to alcohol is from 0.1:1 to 0.5:1.

10. The composition of claim 9 wherein the oxyethylene polymer has one end group terminated by condensation with nonyl phenol.

11. The composition of claim 9 wherein the soap is a soap of triethanolamine.

12. The composition of claim 1 wherein the surfactant is an anionic surfactant.

13. The composition of claim 1 wherein the soap is an amine soap.

14. The composition of claim 1 wherein the surfactant is an ethoxylated nonyl phenol having at least five ethylene oxide groups.

15. A pumpable free flowing aqueous defoaming composition which can be stored in a ready to use form, comprising:
(a) water;
(b) at least one solid alcohol having from 14 to 28 carbon atoms;
(c) at least one solid fatty acid;
(d) at least one soap of a solid fatty acid, said components (b), (c) and (d) being present in the water in an effective defoaming amount and to provide a dispersed solids content in the water of from about 20% to about 30%, by weight; and
(e) a surfactant comprised of at least one member selected from the group consisting of non-ionic surfactants and anionic surfactants, said anionic surfactant being selected from the group consisting of:
alcohol sulfates
alkaryl sulfonates
ethoxylated alcohol sulfates
sulfates and sulfonates of ethoxylated alkyl phenols
sulfates of fatty esters
sulfates and sulfonates of alkyl phenols
sulfonates of condensed naphthalenes
sulfonates of naphthalene
sodium derivatives of sulfo-succinates
alkali salts of petroleum sulfonates
alkali phosphate esters
sulfonated alkyl esters
sodium polymeric carboxylic acid which surfactant in combination with said components (b), (c) and (d) prevents formation of a gelled mass of the solids to provide a pumpable free flowing dispersion of the solids in the water.

16. The composition of claim 15 wherein the solid alcohol is an aliphatic hydrocarbon alcohol having from 14 to 28 carbon atoms, and the solid fatty acid is an aliphatic hydrocarbon fatty acid having from 14 to 28 carbon atoms.

17. The composition of claim 16 wherein the surfactant is at least one non-ionic surfactant.

18. The composition of claim 17 wherein the non-ionic surfactant is a polyoxyethylene having more than two oxyethylene groups having at least one end group terminated by condensation with a member selected from the group consisting of alcohols, alkyl phenols and fatty acids.

19. The composition of claim 18 wherein the surfactant is present in an amount to provide at least 0.1 part by weight of surfactant per 1 part by weight of the total of components (b), (c) and (d), the weight ratio of fatty acid to alcohol is at least 0.2:1 and no greater than 0.5:1 and the weight ratio of fatty acid soap to alcohol is from 0.1:1 to 0.5:1.

20. A process for defoaming in an aqueous system, comprising:
adding to the aqueous system an effective defoaming amount of a composition as defined in claim 1.

21. The process of claim 20 wherein the composition is added to provide at least 1 ppm of the composition in the aqueous system.

22. The process of claim 20 wherein the surfactant is at least one non-ionic surfactant.

23. The process of claim 22 wherein the non-ionic surfactant is a polyoxyethylene having more than two oxyethylene groups having at least one end group terminated by condensation with a member selected from the group consisting of alcohols, alkyl phenols and fatty acids.

24. The process of claim 23 wherein the non-ionic surfactant contains at least 5 oxyethylene groups.

25. The process of claim 24 wherein the surfactant is present in an amount to provide at least 0.1 part by weight of surfactant per 1 part by weight of the total of components (b), (c) and (d).

26. The process of claim 24 wherein the surfactant is an ethoxylated nonyl phenol having at least five ethylene oxide groups.

27. The process of claim 24 wherein the solid alcohol is an aliphatic hydrocarbon alcohol.

28. The process of claim 27 wherein the solid fatty acid is an aliphatic hydrocarbon fatty acid having from 14 to 28 carbon atoms.

29. The process of claim 20 wherein the surfactant is an anionic surfactant.

30. A process for defoaming in an aqueous system, comprising:
adding to the aqueous system an effective defoaming amount of a composition as defined in claim 15.

* * * * *